Patented July 26, 1938

2,124,666

UNITED STATES PATENT OFFICE 2,124,666

METHOD OF MAKING ABRASIVE ARTICLES

Raymond C. Benner and Romie L. Melton, Niagara Falls, N. Y., assignors, by mesne assignments, to The Carborundum Company, Niagara Falls, N. Y., a corporation of Delaware No Drawing. Application October 19, 1936, Serial No. 106,374

5 Claims. (Cl. 51—278)

This invention relates to improved abrasive articles and methods of manufacturing the same. The invention is particularly concerned with methods of making coated abrasive articles wherein the adhesive is applied in the form of an aqueous suspension.

This application is a continuation in part of our copending application Serial No. 735,825, filed July 18, 1934.

The most common adhesive for coated abrasive articles is glue and glue-bonded sandpaper is very old in the art. With the advent of improved forms of synthetic materials, which are broadly classed as "plastics" and include such products as certain kinds of synthetic resins and cellulose esters, it has been found that coated abrasive products which are especially valuable for particular purposes can be made employing these new plastic materials. However, the products of this type have the serious disadvantage from a practical manufacturing standpoint that they are soluble only in special kinds of organic solvents which are relatively expensive and some of which are highly inflammable. Because of this cost it is necessary to employ relatively costly equipment for recovery of the solvent and because of the flammability special precautions are necessary to prevent explosions. Consequently, the use of these new adhesives has been limited. One way of overcoming these difficulties is to liquefy the plastic materials by suspending them in water as in the form of colloidal dispersions.

However, it has been found that when colloidal dispersions of plastic materials are substituted for glue or for solutions of the materials, inferior products are obtained if the ordinary methods of making the articles are employed. Articles made with colloidal dispersions of plastic materials which are highly satisfactory when applied as solutions are poorly efficient and tend to "shed" the abrasive grains.

We have discovered a method by which articles can be made from aqueous suspensions or colloidal dispersions of plastic materials which are equally satisfactory as articles made from solutions of the materials. Our discovery leads us to believe that the difficulties heretofore experienced with aqueous suspensions is caused by the poor adhesion of the plastic materials as they are deposited from the suspension. The method comprises, as an essential step, a treatment to make the plastic, or more correctly the "plastifiable", binding material sticky enough to become strongly attached to the grains and to the backing. Our invention therefore has the advantages inherent in the use of processes for applying water-insoluble plastic binding agents in the form of aqueous suspensions, such as the elimination of the costly and more or less dangerous organic solvents heretofore employed. Our invention also makes it possible to utilize in the production of abrasive coated products binding agents which are in a condition where they are poorly adhesive to abrasive grains and to the backing to which the grains are to be attached. Entirely additional to these practical considerations of manufacturing processes, the products obtained by the method of our invention have been found to be particularly efficient in use.

In accordance with our invention, we suspend the normally-solid plastic binding material in water, coat the backing material with the suspension and with abrasive grains, and then treat the thus coated article to develop adhesiveness in the binding material so that it will adhere to both the grains and the backing and will weld into a continuous body attaching the grains to the backing. The treatment which we employ to develop this adhesiveness of the binding material depends upon the nature of the binding material and the composition of the aqueous suspension thereof.

One method which we have successfully employed consists in incorporating with the binding material a substance which, when the water is removed from the film of dispersion which has been coated onto the backing, will soften the particles of binding material and develop adhesiveness in them. An example of this modification of our invention consists in the inclusion in the binding material of a water-insoluble solvent for the binder which is of sufficiently high boiling point so that it will not be evaporated when the water is removed but will remain on the backing to develop adhesiveness of the binder. For example, we have been able to plastify a binder consisting principally of vinyl resin by including ethylene dichloride with the resin prior to dispersing the resin in water.

Another method by which we have been able to plastify binding materials consists in dissolving in the water which is to form the continuous suspending phase of the dispersion, a relatively small quantity of water-soluble, high-boiling solvent for the binder. For example, we have suspended a pulverized A stage phenol aldehyde product in water containing a small quantity of furfural. Furfural is a solvent for the phenolic resin and when the water had been evaporated there was sufficient furfural remaining to make the particles of solid resin sufficiently sticky and tacky so that they adhered to the backing and to the abrasive grains. A modification of this method consisted in wetting the abrasive grains with a small quantity of furfural so as to supply additional solvent and further promote adhesion of the pulverized resin to the grains. Adhesion of the resin to the backing was also promoted by moistening the surface of the backing which was to be coated with the dispersion with furfural. When the water was removed from the dispersion, the furfural dissolved the surface of the resin particles immediately in contact with the backing and increased adhesion of the resin to the backing as in the case of furfural coated grains where adhesion to the grains was improved. Aqueous suspensions of solid resins of this character deposit a film of a solid resin which is normally non-tacky and very poorly adhesive.

Still another method which we have used to plastify and render binding materials adhesive consists in forming colloidal dispersions including a dispersing agent for the binder which becomes adhesive when the water is removed from the dispersion and thereby causes adhesion of the deposited particles to the backing and to the grains. Examples of such adhesives, which may be spoken of as "temporary adhesives" because they function primarily to assist in adhesion of the grains to the backing in the freshly coated article, comprise such products as glue, polyvinyl alcohol and methyl cellulose. In our invention these materials perform the dual function of suspending the particles of solid binding material in water and subsequently acting as the temporary adhesive for holding the constituents of the article together until the binding material itself is subsequently rendered plastic and made to attach itself to the grains and to the backing and to weld together.

The methods of coating which we have used are those commonly employed in the production of coated abrasives. For example, a web of backing material can be fed through a sandpaper-making machine where a film of the suspension or dispersion is spread onto the backing by a roll which rotates partially immersed in a vat of the dispersion. The adhesive-coated web is then fed under a hopper where abrasive grains are dropped onto the coated surface, and the thus-coated article is caused to travel along into chambers where the water can be removed and the adhesiveness of the binder can be developed. Alternatively, the dispersions may be sprayed onto a backing which may be either in the form of a web or in the form of individual articles such as disc-shaped backings.

Following the removal of the moisture and the treatment to develop adhesiveness, the article may be subjected to heat treatment to make the particles of binding material plastic and cause the welding together of the individual particles deposited from the dispersions. Alternatively, this adhesiveness may be developed by applying a coating of solvent to the article so as to dissolve the outer surface of the binding material and cause welding, followed by treatment to evaporate the solvent which has been thus applied. In the case of heat-hardenable binders, such as heat-reactive phenolic condensation products, additional treatment to harden up the resin to the infusible insoluble condition may be applied as by heating.

The adhesive may all be applied in one step before the abrasive grains are distributed onto the adhesive-coated backing but it is usually more satisfactory to add a second coating of adhesive after the abrasive grains have been applied. The treatments to remove water and to promote adhesion may be carried out either before or after the addition of the second or sizing coating of adhesive according to the steps commonly employed in the manufacture of abrasive coated products. The second or sizing coating of adhesive may be a dispersion or, for that matter, the adhesive may be applied in various forms as by dusting on a powdered adhesive and the second adhesive may or may not be of the same composition as the first or making coat.

As has been indicated, our invention has a number of advantages. It provides a method for using water-insoluble plastic materials in making abrasive coated products which is commercially practical because it dispenses with the organic solvents heretofore employed or, at least, reduces to a minimum the amount of solvent which must be used. The aqueous suspensions are non-tacky and it is easy to distribute them in coatings of uniform thickness. Furthermore, they are of relatively high concentration as contrasted to solutions of many of these materials which are so viscous that it is necessary to use a comparatively dilute solution in order to be able to distribute the solutions on the backings.

It will be understood that various modifying agents can be incorporated in the binding materials to develop degrees of flexibility and toughness as such modifications are well understood in the art of preparing plastic binders. It is also within the scope of our invention to employ other practices common in the production of abrasive coated products such as inclusion of inert fillers with the binding material; as, for example, by utilizing an inorganic dispersing agent such as bentonite or other clay which blends with the organic plastic binding material when the article is treated to weld the individual particles of the binder together.

Other modifications and embodiments of our invention may be practised without departing from the spirit of the invention as defined by the appended claims.

We claim:

1. In the manufacture of abrasive coated products, the steps which comprise preparing an aqueous suspension of a water-insoluble binder which is normally poorly adhesive but adapted to be made adhesive by wetting with a solvent, coating a backing with abrasive grains and with the said suspension, removing the water from the suspension, and treating the article with a solvent to cause the binder to adhere to the grains and to the backing.

2. In the manufacture of abrasive coated products the steps which comprise preparing an aqueous suspension of a water-insoluble binder which is normally poorly adhesive but adapted to be made adhesive by wetting with a solvent, preliminarily wetting a backing with a solvent for the binder, coating the wetted backing with abrasive grains and with the said suspension, and removing water from the suspension.

3. In the manufacture of abrasive coated products the steps which comprise preparing an aqueous suspension of a normally solid phenolic resin in water, coating the backing with abrasive grains and with the said suspension, removing the water from the suspension, and treating the article with a solvent for the resin to make the resin adhesive.

4. In the manufacture of abrasive coated products, the steps which comprises preparing a suspension of a water-insoluble bond in water, which bond is normally poorly adhesive, coating a backing with said suspension and abrasive grains, removing the water from the suspension, and rendering the bond adhesive by wetting with a solvent.

5. In the manufacture of abrasive coated products, the steps which comprise suspending a water-insoluble bond in a liquid mixture of water and a substance which is a solvent for the bond in the absence of water, coating a backing with said suspension and abrasive grains, and removing the water from said suspension whereby the adhesive is caused to adhere to the backing and grain.

RAYMOND C. BENNER.
ROMIE L. MELTON.